L. O. DAVIDSON.
CULTIVATOR ATTACHMENT.
APPLICATION FILED JULY 3, 1914.
1,125,974.
Patented Jan. 26, 1915.
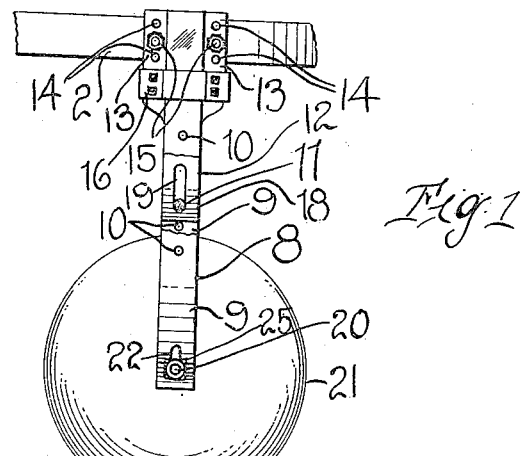
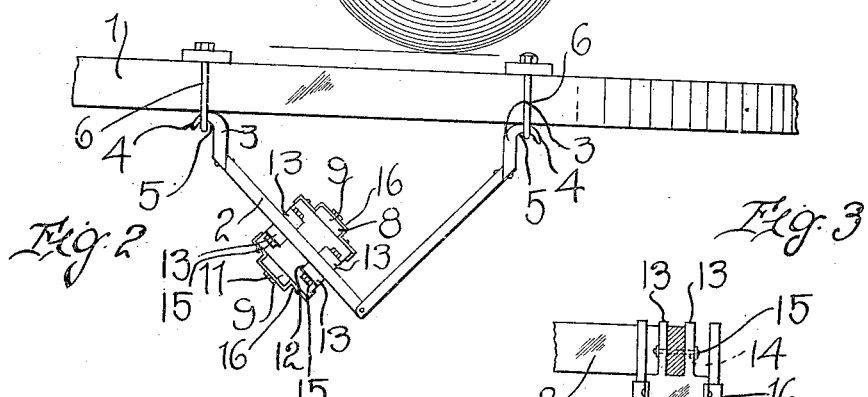
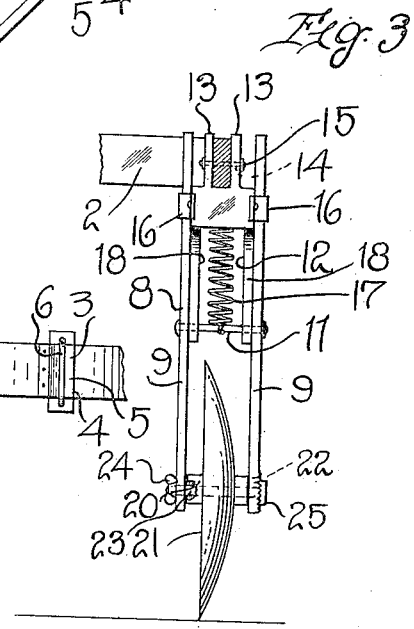
Witnesses
Robert M. Sutphen
A. J. Hind
Inventor
L. O. DAVIDSON
By Watson E. Coleman
Attorney

UNITED STATES PATENT OFFICE.

LEVI O. DAVIDSON, OF STRANG, OKLAHOMA.

CULTIVATOR ATTACHMENT.

1,125,974. Specification of Letters Patent. Patented Jan. 26, 1915.

Application filed July 3, 1914. Serial No. 848,870.

*To all whom it may concern:*

Be it known that I, LEVI O. DAVIDSON, a citizen of the United States, residing at Strang, in the county of Mayes and State of Oklahoma, have invented certain new and useful Improvements in Cultivator Attachments, of which the following is a specification, reference being had to the accompanying drawings.

This invention relates to new and useful improvements in cultivator attachments and more particularly to an adjustable disk fender and weeder attachment, the main object of the present invention being the provision of a disk fender and weeder which is adapted to be removably applied to the beam of a shovel cultivator and relatively adjusted at various angles with respect to the cultivator beam.

Another object of the present invention is the provision of a device of the above character which will possess advantages in points of efficiency and durability, is inexpensive to manufacture and, at the same time is simple in construction and operation.

With the above and other objects in view, the invention consists in the novel features of construction, combination and arrangement of parts as will be hereinafter referred to and more particularly pointed out in the specification and claims.

In the accompanying drawings forming a part of this application, Figure 1 is a side elevation of a cultivator attachment constructed in accordance with my invention. Fig. 2 is a top plan view illustrating the application of the same. Fig. 3 is a front elevation; and Fig. 4 is a side elevation of the attachment arm.

Referring more particularly to the drawing, 1 indicates the main beam of the cultivator and 2 the sectional fastening member which is formed in two sections pivotally connected together at their inner ends and adapted to be rigidly connected to the securing brackets 3, said brackets having outwardly projecting end portions 4 which are formed with curved upper faces 5 adapted to receive the clamping bolts 6, whereby the device may be quickly and readily clamped to the beam 1 or removed therefrom. One section of the member 2 is provided with a plurality of spaced alined openings 7, the purpose of which will be hereinafter more fully set forth. Suspended from the member 2 is a disk supporting bracket 8, which includes two spaced parallel bars 9 having a plurality of spaced openings 10 formed therein which are adapted to receive the reduced ends of the transverse spindle 11.

Arranged between the bars 9 is the supporting member 12, the body portion of which is bifurcated to form two sets of spaced ears, generally indicated by the numeral 13 and which are provided with alined openings as shown at 14, whereby to receive the securing bolts 15 which pass through said ears and through the perforated portion of the member 2, whereby to connect the members 12 and 2. In order to retain the bars 9 against lateral movement, I provide the U-shaped clamps 16, the intermediate portions of which are adapted to embrace the side bars 9, while the ends thereof are rigidly secured to the body portion of the member 12, thus securely retaining the bars against any lateral movement. Arranged between the body portion of the member 12 and the cross pin 11, is a coil spring 17.

It will be apparent that by placing the coil spring 17 between the bars 9 and the pin 11, the bars 9 will be yieldably mounted upon the member 12. The downwardly projecting spaced arms 18 of the member 12 are provided with elongated slots 19 in which the pin 11 is arranged to permit of a free movement of the bars 9. Arranged transversely between the lower ends of the bars 9, is a supporting axle 20 upon which the disk 21 is mounted. The axle 20 is supported in position by means of a transverse bolt 23, the ends of which are arranged within the openings in the lower ends of the bars, one end being movable within the slot 22 formed in one of the side bars. It will be noted that the axle is hollow in form, whereby to readily receive the bolt 23 to support the axle in position. One end of the bolt is provided with a wing nut 24, removably mounted thereon and arranged on the other end of the bolt, is the head 25 having an inner serrated face adapted for engagement with the serrated face of one of the bars 9, so that when the wing nut is loosened, the bolt 23 may be adjusted to dispose the disk at an angle and in order to retain the disk in its angularly disposed adjusted position, the wing nut will be tightened upon the bolt to engage the serrated faces of the bar and head. From this it will be apparent that the axle 20 may be quickly and readily adjusted to various angles so that the disk 21 may also be adjusted to various angles with respect to the supporting means therefor.

It will be apparent that by having the supporting member 2 adjustably mounted upon the plow beam 1, the ends thereof may be adjusted upon the beam so as to dispose one of the sections of the member 2 at an angle and in turn adjust the angle of the supporting part of the disk.

It will be noted that by having the disk yieldably mounted, the same may readily pass over rough and uneven ground, without imparting any upward movement to the plow beam, the spring 17 absorbing any shock which might occur by the passing of the disk over an uneven surface.

It will be apparent from the above that the device can be adjusted so as to be used as a fender or as a weeder and when so adjusted, is securely held against any lateral or longitudinal movement.

The device, in itself is extremely simple in its construction, can be quickly and readily applied to any form of cultivator or plow beam and, at the same time, can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I claim is:—

1. A device of the class described including a sectional bar, a supporting member carried thereby and having spaced arms provided with elongated slots, movable members arranged upon opposite sides of the supporting member, a disk arranged between the lower ends of said members, a bolt carried by said movable members and arranged within the slots of the supporting member, and a coil spring arranged between the body of the supporting member and the bolt, as and for the purpose set forth.

2. A device of the class described including an adjustable sectional bar, a supporting member having spaced ears formed at one end adapted to be arranged upon opposite sides of the bar, means adjustably connecting the ears with the bar, spaced parallel arms projecting downwardly from the body of the supporting member having slots formed therein, movable members arranged upon opposite sides of the supporting member, a bolt carried thereby and movably arranged within said slots, a disk supported between the lower ends of the movable members, and a coil spring arranged between the body of the supporting member and the bolt whereby to provide a yielding movement to the movable elements.

3. A device of the class described including yieldable bars, one of said bars having an elongated slot formed in its outer end and the other of said bars being provided with an opening, a supporting bolt extending through said opening and slot, an axle mounted upon the bolt between the bars, a disk supported by the axle, a head formed upon the bolt provided with an inner serrated face, serrations formed upon one of the bars adapted to co-act with the serrations on the bolt head, and a wing nut upon the other end of the bolt whereby said disk may be adjusted to various angular positions and retained in such position by the co-action of the aforesaid serrated faces.

In testimony whereof I hereunto affix my signature in the presence of two witnesses.

LEVI O. DAVIDSON.

Witnesses:
J. W. KING, Jr.,
ALEX WALKEN.